US008213970B2

(12) United States Patent
Beyer (10) Patent No.: US 8,213,970 B2
(45) Date of Patent: Jul. 3, 2012

(54) METHOD OF UTILIZING FORCED ALERTS FOR INTERACTIVE REMOTE COMMUNICATIONS

(75) Inventor: Malcolm K. Beyer, Jupiter Inlet Colony, FL (US)

(73) Assignee: Advanced Ground Information Systems, Inc., Jupiter, FL (US)

( * ) Notice: Subject to any disclaimer, the term of this patent is extended or adjusted under 35 U.S.C. 154(b) by 367 days.

(21) Appl. No.: 12/324,122

(22) Filed: Nov. 26, 2008

(65) Prior Publication Data
US 2009/0075685 A1    Mar. 19, 2009

Related U.S. Application Data

(63) Continuation-in-part of application No. 11/612,830, filed on Dec. 19, 2006, which is a continuation-in-part of application No. 11/308,648, filed on Apr. 17, 2006, now Pat. No. 7,630,724, which is a continuation-in-part of application No. 10/711,490, filed on Sep. 21, 2004, now Pat. No. 7,031,728.

(51) Int. Cl.
*H04W 4/00* (2009.01)

(52) U.S. Cl. .... 455/466; 455/88; 455/404.2; 455/412.1; 455/412.2; 455/414.4; 455/415; 455/416; 455/418; 455/419; 455/420; 455/456.1; 455/456.3; 455/457; 455/458; 455/463; 455/500; 455/517; 455/518; 455/519; 455/556.2; 701/213; 701/482

(58) Field of Classification Search ................ 455/41.1, 455/416, 518, 519, 41.3, 88, 404.2, 412.1, 455/414.4, 415, 418, 419, 420, 456.1, 456.3, 455/457, 458, 463; 701/213, 482
See application file for complete search history.

(56) References Cited

U.S. PATENT DOCUMENTS

| | | | |
|---|---|---|---|
| 7,031,728 B2 | 4/2006 | Beyer, Jr. | |
| 2002/0061762 A1* | 5/2002 | Maggenti et al. | 455/519 |
| 2004/0082352 A1* | 4/2004 | Keating et al. | 455/519 |
| 2004/0192365 A1* | 9/2004 | Dalton et al. | 455/517 |
| 2005/0241026 A1* | 10/2005 | Esler et al. | D24/100 |
| 2006/0199612 A1 | 9/2006 | Beyer, Jr. et al. | |
| 2008/0076410 A1 | 3/2008 | Beyer | |

* cited by examiner

*Primary Examiner* — Nick Corsaro
*Assistant Examiner* — Amanuel Lebassi
(74) *Attorney, Agent, or Firm* — Malin Haley Dimaggio Bowen & Lhota, P.A.

(57) ABSTRACT

The system and method having a specialized software application on a personal computer or a PDA/cell phone that that enables a participant to force an automatic acknowledgement and a manual response to a text or voice message from other participants within the same network. Each participant's PDA/cell phone includes a force message alert software application program for both creating and processing these forced message alerts. The system and method enabled by the force message alert software application program provides the ability to (a) allow an operator to create and transmit a forced message alert from a sender PDA/cell phone to one or more recipient PCs and PDA/cell phones within the communication network; (b) automatically transmit an acknowledgement of receipt to the sender PDA cell phone upon the receipt of the forced message alert; (c) periodically resend the message to the recipient PCs and PDA/cell phones that have not sent an acknowledgement; (d) provide an indication of which recipient PCs and PDA/cell phones have acknowledged the forced message alert; (e) provide a manual response list on the display of the recipient PC and PDA/cell phone's display that can only be cleared by manually transmitting a response; and (f) provide an indication on the sender PDA/cell phone of the status and content the manual responses.

13 Claims, 6 Drawing Sheets

METHOD OF UTILIZING FORCED ALERTS FOR INTERACTIVE REMOTE COMMUNICATIONS

This application is a continuation-in-part of U.S. patent application Ser. No. 11/612,830 filed on Dec. 19, 2006 which is a continuation-in-part of U.S. patent application Ser. No. 11/308,648 filed Apr. 17, 2006 which is a continuation-in-part of U.S. patent application Ser. No. 10/711,490 now U.S. Pat. No. 7,031,728.

BACKGROUND OF THE INVENTION

1. Field of the Invention

A communications system and method that uses a plurality of PCs and PDA/cell phones for the coordination of two or more people through the use of a communications network. The system and method provide each user with a PC or PDA/cell phone that has forced message alert software that enables a user to create and send a voice or text message alert that forces an automatic acknowledgement upon receipt and a manual response from the recipient.

2. Description of Related Art

The purpose of a communications system is to transmit information bearing digital messages from a source, located at one point, to a user destination, located at another point some distance away. A communications system is generally comprised of three basic elements: transmitter, information channel and receiver. One form of communication in recent years is cellular phone telephony. A network of cellular communication systems set up around an area such as the United States allows multiple users to talk to each other, either on individual calls or on group calls, with handheld devices. Some cellular phone services enable a cellular phone to engage in conference calls with a small number of users. Furthermore, cellular conference calls can be established through 800 number services. Cellular telephony also now includes the ability to access local WiFi connections, allowing the devices to utilize cellular phone data transmission technology as well as the data transmission ability of the Internet.

The method and operation of the integrated PDA/cell phones (cell phone/PDA/GPS with touch screen) used herein is described in U.S. Pat. No. 7,031,728, which is hereby incorporated by reference, pending U.S. patent application Ser. No. 11/308,648, and pending U.S. patent application Ser. No. 11/612,830, and are usually discussed herein as a cell phone.

In many situations it is desirable for a user to be able to simultaneously send a message to the cell phones or PCs of a large group of people. This can be typically accomplished using Digital SMS (Smart Message Service) and TCP/IP messages that are transmitted using cellular technology such as the various versions of GSM and CDMA or via a WiFi local area network. However, in some situations it is additionally desirable to know: (a) which people received the message on their cell phone or PC, (b) which people did not receive the message on their cell phone or PC, and (c) the response of each person receiving the message. Digital SMS and TCP/IP messages do not provide each of those functions. As a result, what is needed is a method in which a sender of a text or voice message can force an automatic acknowledgement upon receipt from a recipient's cell phone or PC and a manual response from the recipient via the recipient's cell phone or PC when sending the text or voice message.

SUMMARY OF THE INVENTION

Applicant's communication system and method described herein is embodied in the forced alert software developed by applicant and installed in the PCs and PDA/cell phones used herein.

A plurality of PCs and PDA/cell phones each having forced alert software installed providing a communication network of PCs and PDA/cell phones with the ability to: a) allow an operator to create and transmit (via TCP/IP or another digital transmission means) a forced voice alert, wherein said forced voice alert is comprised of a text or voice message file and a forced alert software packet, from a sender PC or PDA/cell phone to one or more recipient PCs and PDA/cell phones within said communication network; (b) automatically transmit an acknowledgement of receipt from said recipient PCs and PDA/cell phones to the sender PCs or PDA/cell phones upon receipt of the forced message alert by the recipient PCs and PDA/cell phones; (c) periodically resend the message to the recipient PCs and PDA/cell phones that have not sent an acknowledgement until an acknowledgement is received from every recipient PC and PDA/cell phone; (d) provide an indication on the display of the sender PC or PDA/cell phone of which recipient PCs and PDA/cell phones have acknowledged the forced message alert; (e) provide a manual response list on the display of the recipient PC and PDA/cell phone's display that can only be cleared by manually selecting and transmitting a response from the list or recording and transmitting a voice response after sending said automatic acknowledgment; and (f) provide an indication on the sender PC or PDA/cell phone of the status the manual response and the content of the manual response from each recipient PCs and PDA/cell phones.

A communication network server can act as a forwarder for TCP/IP communications between any combination of PC users or PDA/cell phone users. The server can also act as a forwarder of data addressed from one participant to one or more addressed participants, thus permitting the transmission of forced text or voice messages, other messages, photographs, video, E-mail and URL data from one network participant to other selected network participants.

The above functions can also be accomplished using WiFi, WiMax or other peer to peer communications. However, for use with cellular communications and to assure the level of security that cell phone companies require, a centralized static IP routable server is used.

It is the object of this invention provide to a method in which by sending a forced text or voice message to a recipient or a group of recipients, a sender can compel an automatic acknowledgement of receipt from each recipient's PC or PDA/cell phone and require a manual response from the recipient via the recipient's cell phone before the message can be cleared.

In accordance with these and other objects which will become apparent hereinafter, the instant invention will now be described with particular reference to the accompanying drawings.

BRIEF DESCRIPTION OF THE DRAWINGS

FIG. 1b shows a flow chart that explains the device shown in FIG. 1a.

PREFERRED EMBODIMENT OF THE INVENTION

A communication system and method that joins participants in a communications network using personal computers ("PC") and handheld cell phones having integrated personal digital assistant ("PDA/cell phone") with a forced message alert software application program that allows a participant to send a text or voice message to a group of people and force an automatic acknowledgment of receipt and a manual response.

Each PDA/cell phone described herein for the participant network has its own individual on/off power and can function just as any other cell phone. It can also function with its PDA. To operate on the network, obviously the PDA/cell phone power switch has to be on. If the PDA/cell phone is completely turned off, then it is not part of the participating network and cannot send or receive any forced message alerts. In addition to its own on and off power switch, it has the forced message alert software application program that is activated manually when preparing to send a text or voice message or is activated automatically when receiving a forced message alert from another PC or PDA/cell phone.

Each PC described herein is like any other contemporary PC, except that it has the forced message alert software application program installed on it. To operate on the network, obviously the PC must be on and have an active connection to the Internet or other digital transmission means. If the PC is completely turned off, then it is not part of the participating network and cannot send or receive any forced message alerts. The forced message alert software application program on the PC is activated manually when preparing to send a text or voice message or is activated automatically when receiving a forced message alert from another PC or PDA/cell phone.

The communication system also includes a server that acts as a forwarder for IP communications between any combination of PDA/cell phone users and/or PC based users. Network participant location, identity and status messages are sent to the server by each user. The users are the network participants. Network participant entered tracks are also sent to the server. Because this data is of interest to all the network participants, the server forwards the data received from one participant to all other participants, thus providing the information necessary for all network participants to know the identity, location and status of all other network participants. In addition, the server keeps all of the network participants updated on information kept in its databases, such as all of the participants' telephone numbers, E-mail addresses and other information necessary to carry on the communications described herein.

The server also acts as a forwarder of data addressed from one participant to one or more addressed participants, thus permitting the transmission of forced message alerts, other text and voice messages, photographs, video, E-mail and URL data from one network participant to other selected network participants.

The above functions can also be accomplished using WiFi, WiMax, or other peer to peer communications. However, for use with cellular communications and to assure the level of security that cell phone companies require, a centralized static IP routable server is used.

Figure 1A:
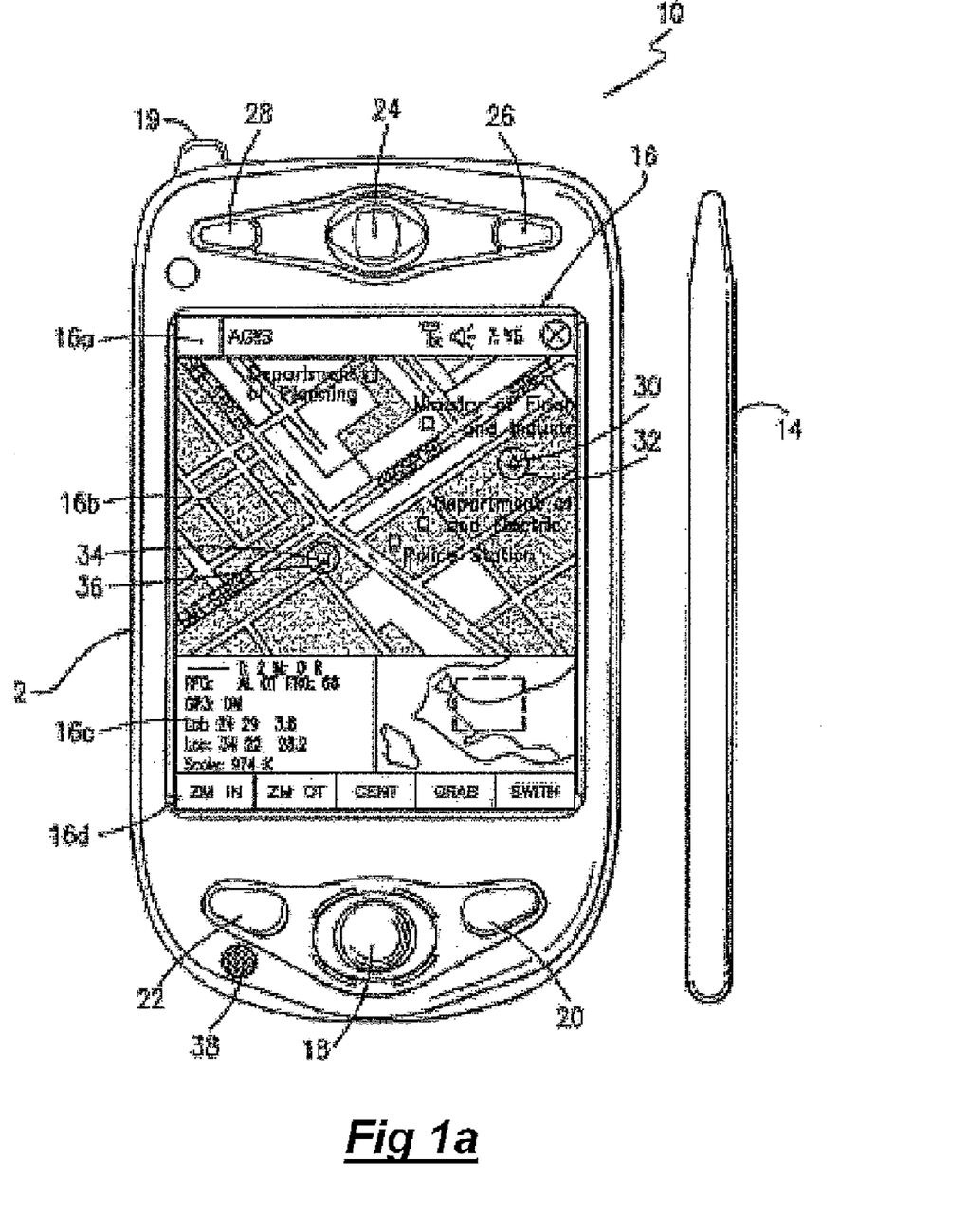
FIG. 1a shows a front elevational view of an integrated PDA/cell phone having a touch screen that includes forced message alert software described herein.
Figure 1B:
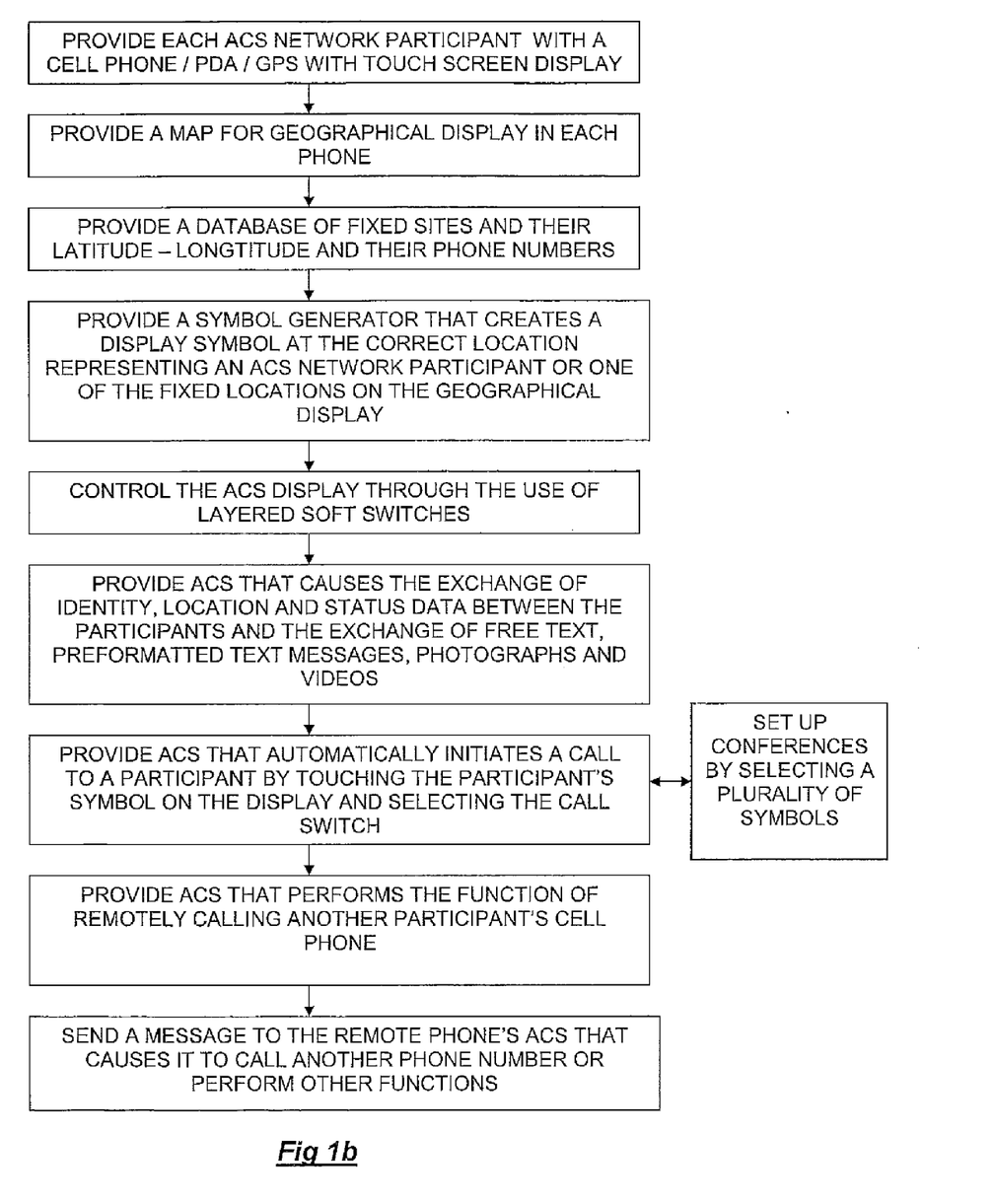

Referring now to the drawings and, in particular, FIGS. 1a and 1b, a small handheld cellular phone 10 is shown that includes a PDA integrated in housing 12 that includes an on/off power switch 19, a microphone 38, and an LCD display 16 that is also a touch screen system. The small area 16a is the navigation bar that depicts the telephone, GPS and other status data and the active software. Each cell phone includes a CPU and databases that store information useful in the communication network. With the touch screen 16, data can be entered through the operator using a stylus 14 (or operator finger) by manipulatively directing the stylus 14 to literally touch display 16. Soft switches 16d displayed on the display 16 are likewise activated by using a stylus 14 and physically and manipulatively directing the stylus to literally touch display 16. The display x, y coordinates of the touched point are known by a CPU in the PDA section of the communication system in housing 12 that can coordinate various information contained in the PDA relative to the x, y coordinate position on the display 16. Inside housing 12 is contained the conventional cellular phone elements including a modem, a CPU for use with a PDA and associated circuitry connected to speaker 24 and microphone 38. Conventional PDA/cellular phones are currently on sale and sold as a unit that can be used for cellular telephone calls and sending cellular SMS and TCP/IP or other messages using the PDA's display 16 and CPU. The device 10 includes a pair of cellular phone hardware activating buttons 20 to turn the cellular phone on and 22 to turn the cellular phone off. Navigation pad actuator 18 is similar to a joy or force stick in that the actuator 18 manually provides movement commands that can be used by the PDA's software to move a cursor on display 16. Switches 26 and 28 are designed to quickly select an operator specified network software program. Speaker 24 and microphone 38 are used for audio messages. Switch 19 at the top left of device 10 is the power on and power off switch for the entire device.

The heart of the invention lies in the forced message alert software application program provided in each PC or PDA/cell phone. The forced message alert software application program is activated through use of a screen drawn soft switch or by clicking on an icon on the PC or PDA/cell phone display screen or when a forced message alert transmission is received by another PC or PDA/cell phone. The display 16 is mounted within the housing 12 as part of the PDA and the CPU (not shown). The internal CPU includes databases and software application programs that provide for a geographical map and georeferenced entities that are shown as display portion 16b that includes as part of the display various areas of interest in the particular local map section.

When looking at display 16, the software switches (soft switches) which appear at the very bottom of the display 16d are used to control by touch many of the software driven functions of the PDA/cell phone. The soft switches are activated through the operator's use of the navigation pad 18, or a small track ball, force stick or similar hardware display cursor pointing device. Alternatively, the operator may choose to activate the software switches by touching the screen with a stylus 14 (or finger) at the switches' 16*d* locations. When some of the software switches are activated, different software switches appear. The bar display 16*d* shows the software switches "ZM IN (zoom in)," "ZM OT (zoom out)," "CENT (center)" and "GRAB (pan/grab)" at the bottom of the screen. These software switches enable the operator to perform these functions. The "SWITH (switch)" software switch at the lower right causes a matrix of layered software switches (soft switches) to appear above the bottom row of switches. Through use of the software switches, the operator can also manipulate the geographical map 16*b* or chart display. When looking at FIG. 1*a*, display symbols depict permanent geographical locations and buildings are shown. For example, the police station is shown and, when the symbol is touched by the stylus or finger, the latitude and longitude of the symbol's location, as shown in display section 16*c*, is displayed at the bottom left of the screen. The bottom right side of display 16*c* is a multifunction inset area that can contain a variety of information including: a) a list of the communication link participants; b) a list of received messages; a) a map, aerial photograph or satellite image with an indication of the zoom and offset location of the main map display, which is indicated by a square that depicts the area actually displayed in the main geographical screen 16*b*; d) applicable status information; and e) a list of the communication net participants. Each participant user would have a device 10 shown in FIGS. 1*a* and 1*b*.

Also shown on the display screen 16, specifically the geographical display 16*b*, is a pair of different looking symbols 30 and 34, a small triangle and a small square, which are not labeled. These symbols 30 and 34 can represent communication net participants having cellular phones in the displayed geographical area that are part of the overall cellular phone communications net, each participant having the same device 10 used. The latitude and longitude of symbol 30 is associated within a database with a specific cell phone number and, if available, its IP address and E-mail address. The screen display 16*b*, which is a touch screen, provides x and y coordinates of the screen 16*b* to the CPU's software from a map in a geographical database. The software has an algorithm that relates the x and y coordinates to latitude and longitude and can access a communications net participant's symbol or a fixed or movable entity's symbol as being the one closest to that point.

In order to initiate a telephone call to the PDA/cell phone user (communication net participant) represented by symbol (triangle) 30 at a specific latitude and longitude displayed on chart 16*b*, the operator touches the triangle 30 symbol with the stylus 14. The operator then touches a "call" software switch from a matrix of displayed soft switches that would overlay the display area 16*c*. Immediately, the PDA/cell phone will initiate a cellular telephone call to the PDA/cell phone user at the geographical location shown that represents symbol 30. A second PDA/cell phone user (communication net participant) is represented by symbol 34 which is a small square (but could be any shape or icon) to represent an individual cellular phone device in the display area. The ring 32 around symbol 30 indicates that the symbol 30 has been touched and that a telephone call can be initiated by touching the soft switch that says "call." When this is done, the telephone call is initiated. Other types of symbolic elements on the display 16 can indicate that a cellular phone call is in effect. Additionally, the operator can touch both symbol 34 and symbol 30 and can activate a conference call between the two cellular phones and users represented by symbols 30 and 34. Again, a symbolic ring around symbol 34 indicates that a call has been initiated.

Equally important, an operator/user with a PDA/cell phone call the police station or any other specific geographical facility displayed on the cell display map, including: buildings, locations of people, vehicles, facilities, restaurants, and the like, whose PDA/cell phone numbers and, if available, E-nail addresses, IP addresses and their URLs are previously stored in the database, by touching a specific facility location on the map display using the stylus 14 and then touching the cellular phone call switch. As an example, the operator/user can touch and point to call a restaurant using a soft switch by touching the restaurant location on the display with a stylus and then touching the call soft switch. The cellular phone will then call the restaurant. Thus, using the present invention, each participant can touch and point to call to one or more other net participants symbolically displayed on the map, each of whom has a device as shown in FIG. 1*a* and can also point to call facilities and regular phone numbers that had been previously stored in the phone's database. Furthermore, this symbol hooking and soft switch technique can be used to go to a fixed facility's website or to automatically enter the fixed facility's E-mail address in an e-mail.

Each PDA/cell phone user device is identified on the map display of the other participants users' phone devices by a display symbol that is generated on each user phone display to indicate each user's identity. Each symbol is placed at the correct geographical location on the user display and is correlated with the map on the display. The operator of each PDA/cell phone device may also enter one or more other fixed entities (buildings, facilities, restaurants, police stations, etc.) and geo-referenced events such as fires, accidents, or other events into its database. This information can be likewise transmitted to all the other participants on the communications net. The map, fixed entities, events and PDA/cell phone device communication net participants' latitude and longitude information is related to the "x" and "y" location on the touch screen display map by a mathematical correlation algorithm.

When the PDA/cell phone device user uses a stylus or finger to touch one or more of the symbols or a location displayed on the cellular phone map display, the system's software causes the status and latitude and longitude information concerning that symbol or location to be displayed. In order to hook a symbol or "track" such as another net participant which represents an entity on the geo-referenced map display, or a fixed geographical entity such as a restaurant, police station or a new entity observed by a cell phone user which is discussed below, the operator points at or near the location of a geo-referenced symbol appearing on the PDA/cell phone display that represents a specific track or specific participant or other entity. The hook application software determines that the stylus is pointed close to or at the location of the symbol and puts a circle, square or other indication around the symbol indicating that amplification information concerning the symbol is to be displayed and indicating that additional data or change in data can be made to the indicated symbol. The hook application code then sends a message to the display application code to display the net participant, facility or entity's amplifying data. The display application code retrieves the primary data and amplification data concerning the symbol or entity from the database and displays the information at the correct screen location. The operator can then read the amplification data that relates to that specific symbol at the specific location. The PDA/cell phone operator can also select soft switches on the touch screen display to change the primary data and amplification data. Furthermore, the operator can use a similar method of hooking and selecting to activate particular soft switches to take other actions which could include: making cellular phone calls, conference calls, 800 number calls; sending a free text message, operator selected preformatted messages, photographs or videos to the hooked symbol; or to drop a entered symbol.

Each known net participant has a PDA/cell phone number, IP address and, if available, E-mail address that is stored in each participant's device database.

Figure 2:
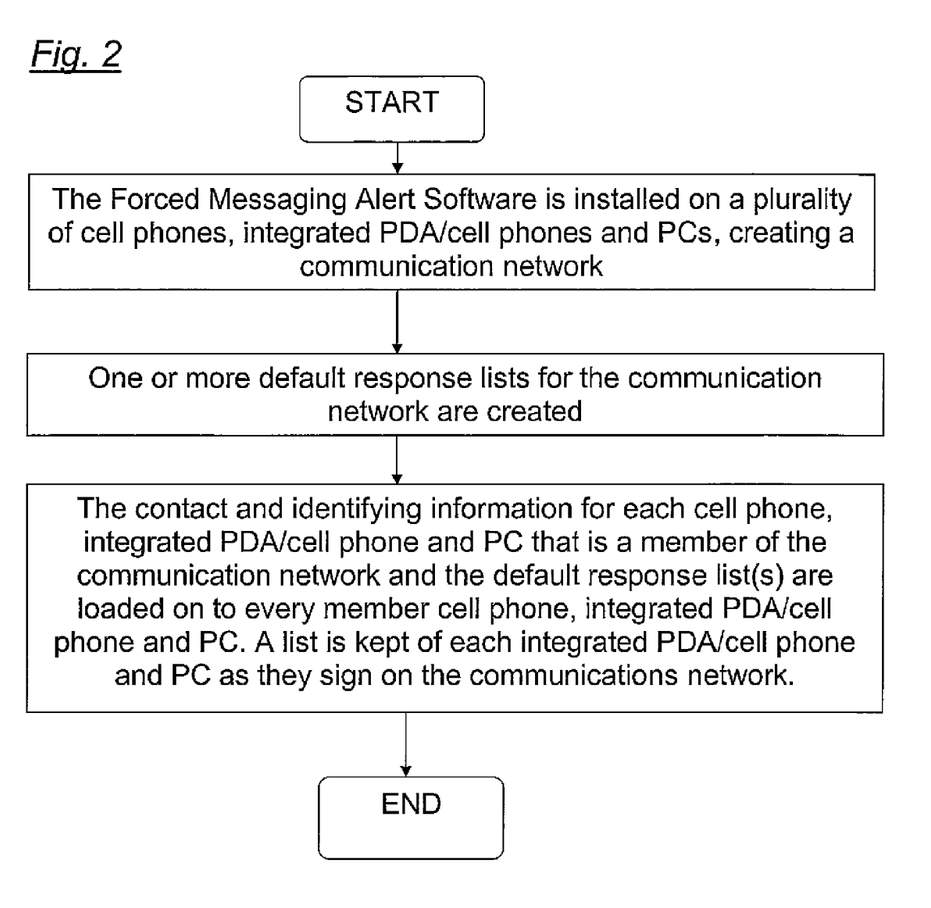
FIG. 2 shows the installation and set up of the forced message alert software on a communication network of cell phones, integrated PDA/cell phones, and PCs.

Referring now to FIG. 2, in order to set up a communication network that utilizes the forced message alert system, the forced message alert software application program must be installed on a plurality of PCs and/or PDA/cell phones. The application will provide for a forced alert message that can be designated for transmission according to several criteria: a.) A single PC and/or PDA/cell phone, b.) The list of users currently participating in the network, and c.) A user or administrator predefined list of network participants.

A required response list which will be either preinstalled in the phone application software or sent with the forced message alert will be presented to the user operator upon receipt of the forced message. When the forced text or voice alert is received, the user operator is presented with the required response list. In order to clear the forced text message alert from the user operator's PC or PDA/cell phone display, the user operator is required to select a reply from this list. If the alert is a voice message, the message keeps repeating at a defined rate until the user operator selects from the required response list. A military default response list would typically consist of choices such as, "will comply," "will not comply," and "have complied." However, depending on the nature of the industry in which the users in the communication network are in, this default response list could vary significantly.

The contact and identifying information for each PC and PDA/cell phone that is anticipated to be a member of the communication network and the default response list is loaded on to every member PC and PDA/cell phone in the preferred embodiment. This step makes sure the each user of the communication network has, in addition to the necessary software, the necessary information to send a forced message alert to any and every known member of the communication network. When operating in an open network mode where all that know the password can join the network, the default list is created or expanded as new members join.

Figure 3A:
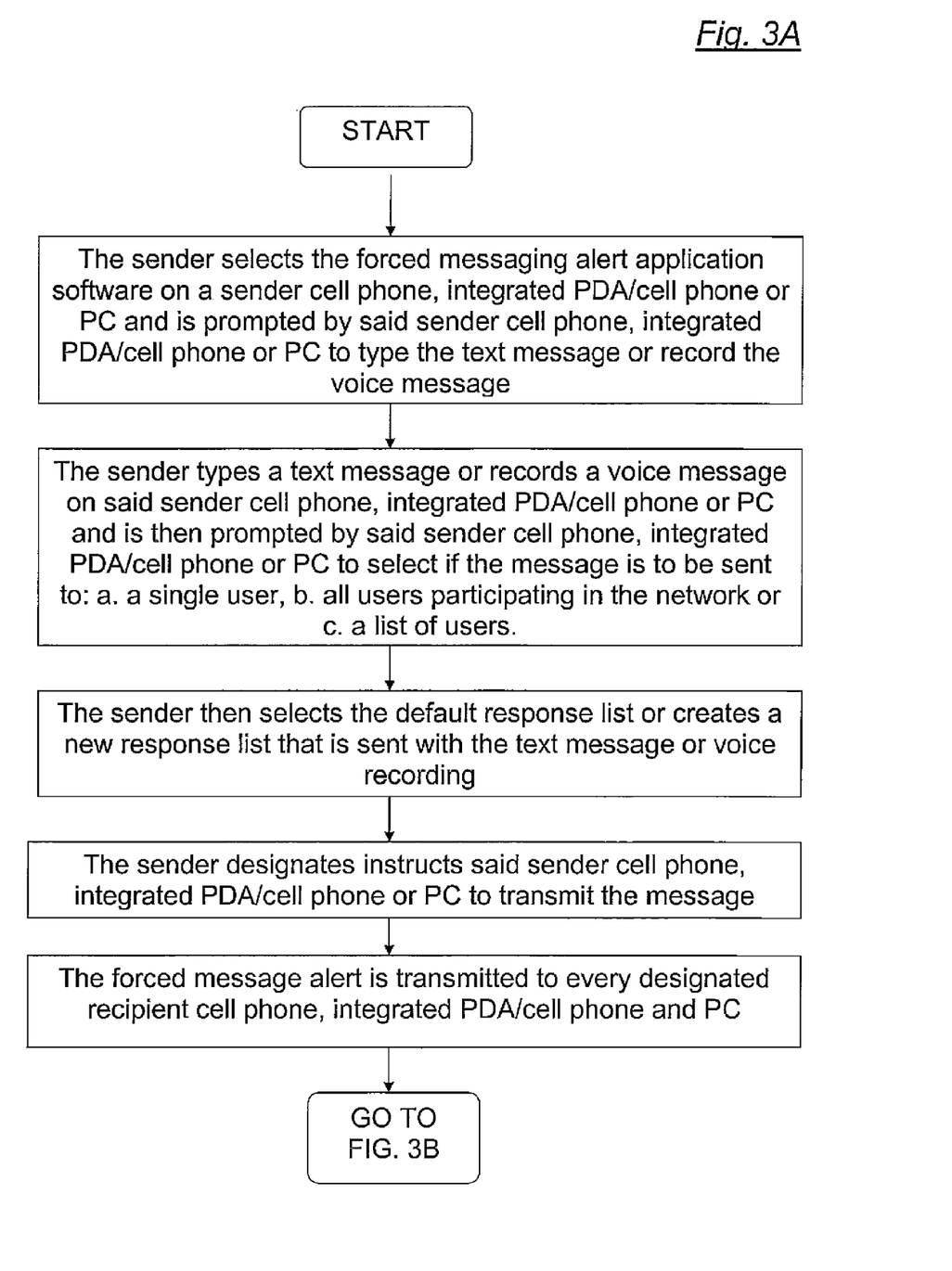
FIG. 3A shows the first section of a flow chart showing a process of sending a forced message alert to one or more recipients as well as for ascertaining which recipients received the forced message alert and which recipients responded to the forced message alert.
Figure 3B:
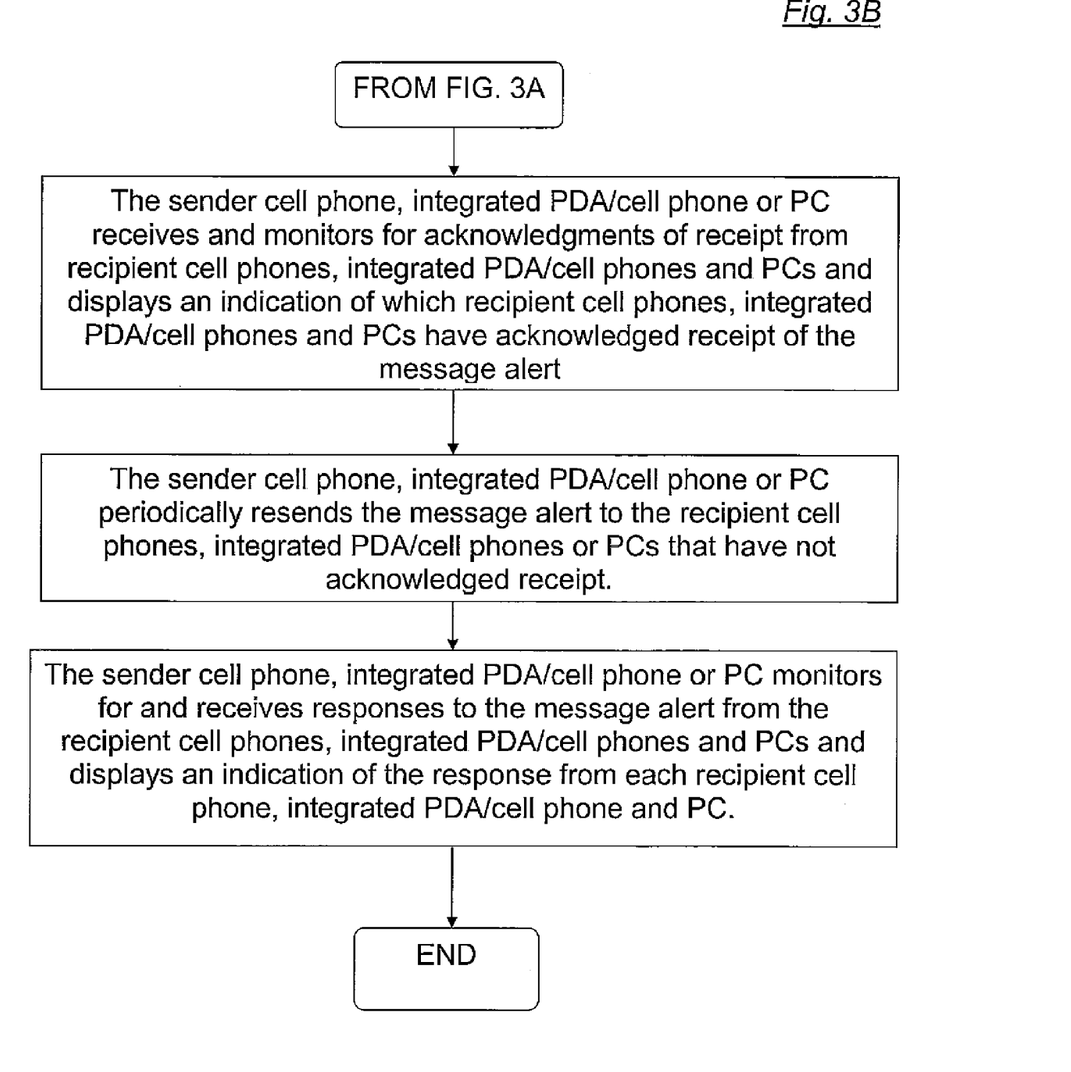
FIG. 3B shows the second section of a flow chart showing a process of sending a forced message alert to one or more recipients as well as for ascertaining which recipients received the forced message alert and which recipients responded to the forced message alert.

Referring now to FIG. 3A and FIG. 3B, the process of sending a forced message alert from a PC or PDA/cell phone begins with a sender selecting the forced message alert software application program on a sender PC or PDA/cell phone. The sender can then select by said sender PC or PDA/cell phone to type a text message or record a voice message or select the text alert or voice alert from a list. Once the sender types a text message or records a voice message or selects a voice or text message on said PC or PDA/cell phone, the sender can then use a soft switch or selection from a list to send the forced alert to: a.) Another network participant, b.) The current PC or PDA/cell phone network participants or c.) A user or administrator predefined list of network participants. The response list from which the message receiver must select can either be included in the forced alert message or be preloaded in each phone. The forced alert message is then transmitted via TCP/IP or other digital transmission means to every PC or PDA/cell phone designated to receive the forced message alert either directly or through a server whose function is to retransmit the messages to the correct users in the communications network.

After the forced message alert is transmitted, the sender PC or PDA/cell phone monitors for and receives electronic transmissions with acknowledgments of receipt from the PCs or PDA/cell phones that have received the forced message alert. Then, the sender PC or PDA/cell phone provides an indication of which of the PC or PDA/cell phone that the forced message alert was sent to have acknowledged receipt and which of the PC or PDA/cell phone that the forced message alert was sent to have not acknowledged receipt on its display. The sender PC or PDA/cell phone will then periodically resend the forced message alert to the PC or PDA/cell phone that have not acknowledged receipt.

The sender PC or PDA/cell phone also monitors for and receives electronic transmissions with manual responses to the forced message alert from the PC or PDA/cell phone that received the message. As these electronic transmissions with manual responses are received, the sender PC or PDA/cell phone displays an indication of the response from each recipient cell phone, integrated PDA/cell phone and PC.

Figure 4:
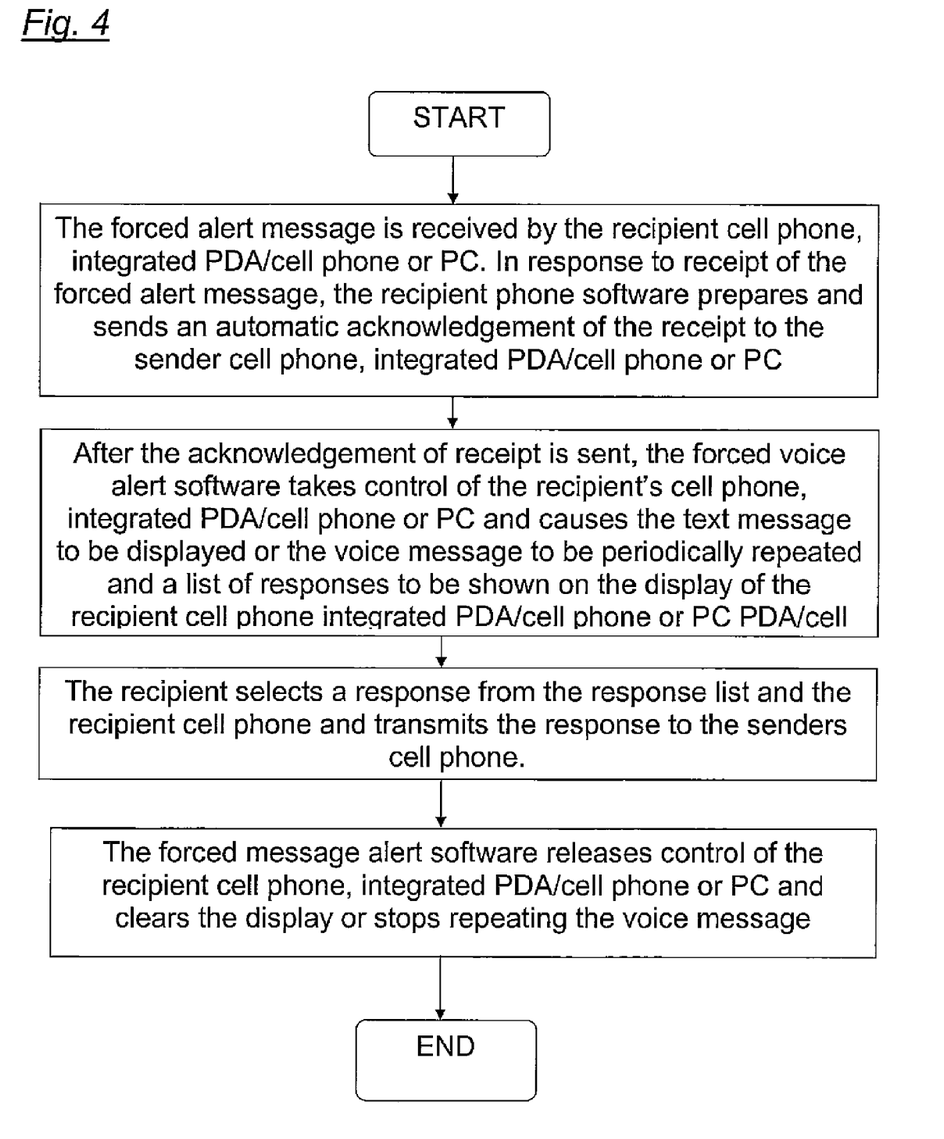
FIG. 4 shows a flow chart showing a process of receiving a forced message alert as well as providing an acknowledgment of receipt and a response by the recipient.

Referring now to FIG. 4, the process of receiving, acknowledging and responding to a forced message alert from the sender PC or PDA/cell phone begins when an electronic transmission is received by a recipient PC or PDA/cell phone. When the electronic transmission is received by the recipient PC or PDA/cell phone, the recipient PC or PDA/cell phone identifies the transmission as a forced message alert and the forced message alert software application program on the recipient PC or PDA/cell phone separates the text or voice message and the forced message alert software packet. Immediately following the detection of the forced message alert, the forced message alert software application program on the recipient PC or PDA/cell phone prepares and electronically transmits an automatic acknowledgement of receipt to the sender PC or PDA/cell phone. However, if the recipient PC or PDA/cell phone is powered off or is not able to receive electronic transmissions, the forced message alert is not received by the recipient PC or PDA/cell phone and no acknowledgment is transmitted. If no acknowledgement is received, the sender PC or PDA/cell phone continues to transmit the forced alert at a predefined rate until acknowledged.

After the acknowledgement of receipt is transmitted, the forced voice alert software application program effectively takes control of the recipient PC or PDA/cell phone. If a text message was received, the forced voice alert software application program causes the text message and the response list to be shown on the display of the recipient PC or PDA/cell phone until a manual response is selected from the response list. Upon selection of the desired response, the forced alert text data is cleared from the recipient PC or PDA/cell phone display. If a voice message was received, the forced voice alert software application program causes the voice message to be periodically repeated using the speakers of the recipient PC or PDA/cell phone while the response list is shown on the display. This voice message cannot be stopped from repeating until one of the entries on the response list is selected.

Once a response is selected or recorded and transmitted to the sender PC or PDA/cell phone, the forced message alert software application program releases effective control of the recipient PC or PDA/cell phone, clears the display, and or stops repeating the voice message and transmits the response to the force alert sender.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A communication system for transmitting, receiving, confirming receipt, and responding to an electronic message, comprising:

a predetermined network of participants, wherein each participant has a similarly equipped PDA/cell phone that includes a CPU and a touch screen display a CPU and memory;

a data transmission means that facilitates the transmission of electronic files between said PDA/cell phones in different locations;

a sender PDA/cell phone and at least one recipient PDA/cell phone for each electronic message;

a forced message alert software application program including a list of required possible responses to be selected by a participant recipient of a forced message response loaded on each participating PDA/cell phone;

means for attaching a forced message alert software packet to a voice or text message creating a forced message alert that is transmitted by said sender PDA/cell phone to the recipient PDA/cell phone, said forced message alert software packet containing a list of possible required responses and requiring the forced message alert software on said recipient PDA/cell phone to transmit an automatic acknowledgment to the sender PDA/cell phone as soon as said forced message alert is received by the recipient PDA/cell phone;

means for requiring a required manual response from the response list by the recipient in order to clear recipient's response list from recipient's cell phone display;

means for receiving and displaying a listing of which recipient PDA/cell phones have automatically acknowledged the forced message alert and which recipient PDA/cell phones have not automatically acknowledged the forced message alert;

means for periodically resending said forced message alert to said recipient PDA/cell phones that have not automatically acknowledged the forced message alert; and means for receiving and displaying a listing of which recipient PDA/cell phones have transmitted a manual response to said forced message alert and details the response from each recipient PDA/cell phone that responded.

2. The system as in claim 1, wherein the forced message alert software application program on the recipient PDA/cell phone includes:

means for transmitting the acknowledgment of receipt to said sender PDA/cell phone immediately upon receiving a forced message alert from the sender PDA/cell phone;

means for controlling of the recipient PDA/cell phone upon transmitting said automatic acknowledgment and causing, in cases where the force message alert is a text message, the text message and a response list to be shown on the display of the recipient PDA/cell phone or causes, in cases where the forced message alert is a voice message, the voice message being periodically repeated by the speakers of the recipient PDA/cell phone while said response list is shown on the display;

means for allowing a manual response to be manually selected from the response list or manually recorded and transmitting said manual response to the sender PDA/cell phone; and means for clearing the text message and a response list from the display of the recipient PDA/cell phone or stopping the repeating voice message and clearing the response list from the display of the recipient PDA/cell phone once the manual response is transmitted.

3. The system as in claim 1, wherein said data transmission means is TCP/IP or another communications protocol.

4. The system as in claim 1, wherein the response list that is transmitted within the forced message alert software packet is a default response list that is embedded in the forced message alert software application program.

5. The system as in claim 1, wherein the response list that is transmitted within the forced message alert software packet is a custom response list that is created at the time the specific forced message alert is created on the sender PDA/cell phone.

6. A method of sending a forced message alert to one or more recipient PDA/cell phones within a predetermined communication network, wherein the receipt and response to said forced message alert by each intended recipient PDA/cell phone is tracked, said method comprising the steps of:

accessing a forced message alert software application program on a sender PDA/cell phone;

creating the forced message alert on said sender PDA/cell phone by attaching a voice or text message to a forced message alert application software packet to said voice or text message;

designating one or more recipient PDA/cell phones in the communication network;

electronically transmitting the forced message alert to said recipient PDA/cell phones;

receiving automatic acknowledgements from the recipient PDA/cell phones that received the message and displaying a listing of which recipient PDA/cell phones have acknowledged receipt of the forced message alert and which recipient PDA/cell phones have not acknowledged receipt of the forced message alert;

periodically resending the forced message alert to the recipient PDA/cell phones that have not acknowledged receipt;

receiving responses to the forced message alert from the recipient PDA/cell phones and displaying the response from each recipient PDA/cell phone; and providing a manual response list on the display of the recipient PDA/cell phone that can only be cleared by the recipient providing a required response from the list;

clearing the recipient's display screen or causing the repeating voice alert to cease upon recipient selecting a response from the response list required that can only be cleared by manually selecting and transmitting a response to the manual response list.

7. The method as in claim 6, wherein each PDA/cell phone within a predetermined communication network is similarly equipped and has the forced message alert software application program loaded on it.

8. The method as in claim 6, wherein said forced message alert application software packet contains a response list, wherein said response list is a default list embedded in the forced message alert software application program.

9. The method as in claim 6, wherein said forced message alert application software packet contains a response list, wherein said response list is a custom response list that is created at the time the specific forced message alert is created on the sender PDA/cell phone.

10. A method of receiving, acknowledging and responding to a forced message alert from a sender PDA/cell phone to a recipient PDA/cell phone, wherein the receipt, acknowledgment, and response to said forced message alert is forced by a forced message alert software application program, said method comprising the steps of:

receiving an electronically transmitted electronic message; identifying said electronic message as a forced message alert, wherein said forced message alert comprises of a voice or text message and a forced message alert application software packet, which triggers the activation of the forced message alert software application program within the recipient PDA/cell phone;

transmitting an automatic acknowledgment of receipt to the sender PDA/cell phone, which triggers the forced message alert software application program to take control of the recipient PDA/cell phone and show the content of the text message and a required response list on the display recipient PDA/cell phone or to repeat audibly the content of the voice message on the speakers of the recipient PDA/cell phone and show the required response list on the display recipient PDA/cell phone; and transmitting a selected required response from the response list in order to allow the message required response list to be cleared from the recipient's cell phone display, whether said selected response is a chosen option from the response list, causing the forced message alert software to release control of the recipient PDA/cell phone and stop showing the content of the text message and a response list on the display recipient PDA/cell phone and or stop repeating the content of the voice message on the speakers of the recipient PDA/cell phone;

displaying the response received from the PDA cell phone that transmitted the response on the sender of the forced alert PDA/cell phone; and providing a list of the recipient PDA/cell phones have automatically acknowledged receipt of a forced alert message and their response to the forced alert message.

11. The method as in claim 10, wherein each PDA/cell phone within a predetermined communication network is similarly equipped and has the forced message alert software application program loaded on it.

12. The method as in claim 10, wherein said forced message alert application software packet contains a response list, wherein said response list is a default list embedded in the forced message alert software application program.

13. The method as in claim 10, wherein said forced message alert application software packet contains a response list, wherein said response list is a custom response list that is created at the time the specific forced message alert is created on the sender PDA/cell phone.

* * * * *